UNITED STATES PATENT OFFICE.

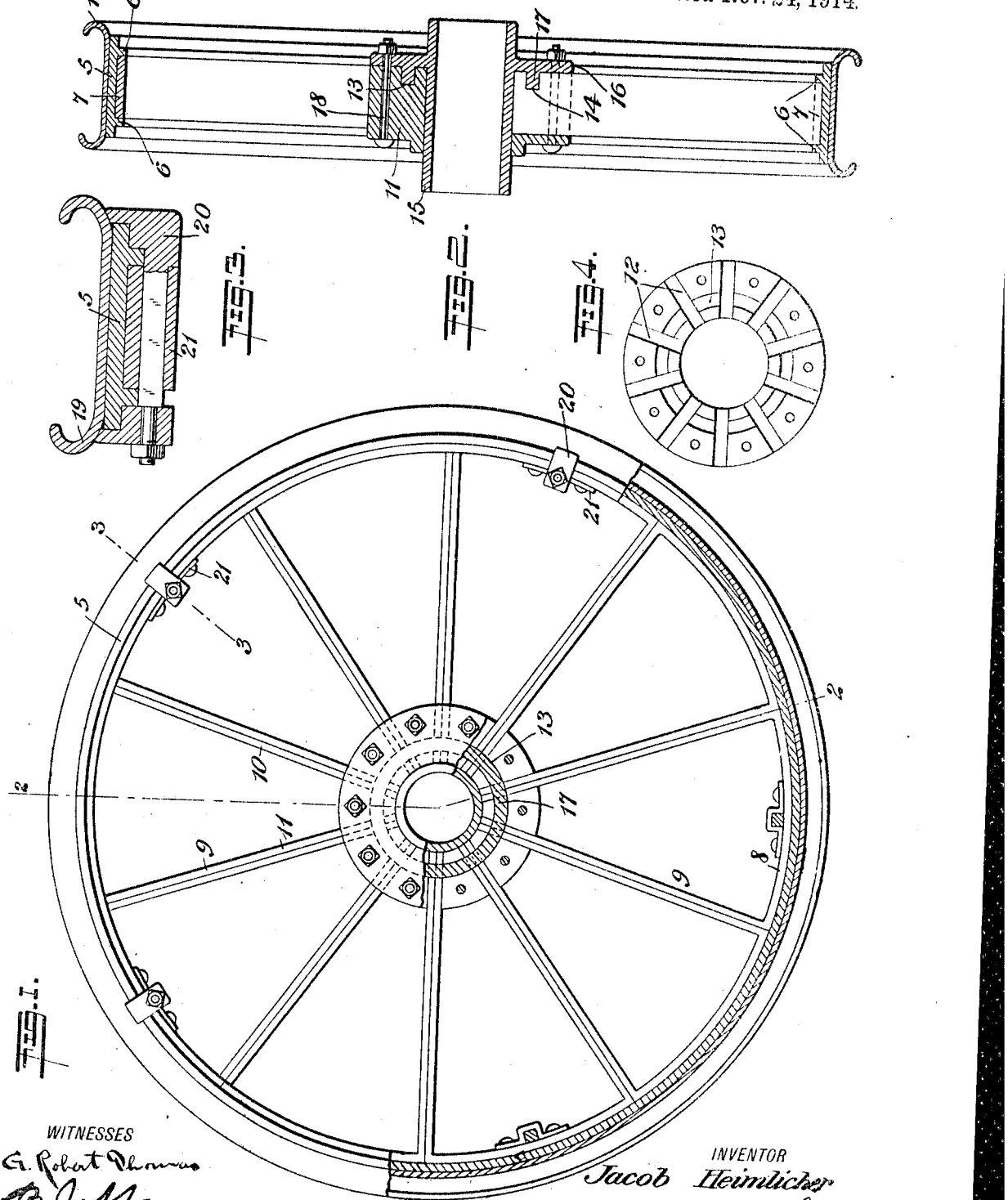

JACOB HEIMLICHER, OF DEFIANCE, OHIO, ASSIGNOR OF ONE-HALF TO WILLIAM GEIGER, OF DEFIANCE, OHIO.

VEHICLE-WHEEL.

1,118,767. Specification of Letters Patent. Patented Nov. 24, 1914.

Application filed June 23, 1914. Serial No. 846,781.

*To all whom it may concern:*

Be it known that I, JACOB HEIMLICHER, a citizen of the United States, and a resident of Defiance, in the county of Defiance and State of Ohio, have invented a new and Improved Vehicle-Wheel, of which the following is a full, clear, and exact description.

My invention relates to vehicle wheels, and has reference more particularly to metallic wheels.

An object thereof is to provide a simple, strong and inexpensive wheel having a demountable rim.

A further object of the invention is to provide a metallic rim having comparatively resilient spokes removably associated with the felly and hub.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a face elevation of a wheel embodying my invention, partly sectionalized to show the details of construction; Fig. 2 is a vertical section on line 2—2, Fig. 1; Fig. 3 is an enlarged section on line 3—3, Fig. 1; and Fig. 4 is a face elevation of the hub portion which has the nest for the spokes.

Referring to the drawings, 5 represents a rim which is provided with annular beads 6 adjacent each side thereof forming an annular groove 7. Fitting into the groove 7 are the arcuated parts 8 of the sectorial spokes 9. The said sectorial spokes have their radial branches 10 preferably integral with the arcuated part 8. The branches 10 of the adjacent spokes contact with each other, and it may be said that the two contacting branches of the adjacent sectorial spokes form one branch. The ends of the branches 10 nest in the hub portion 11. The said hub portion is annular and has radial slots 12 extending from the inner to the outer lateral surface thereof and is open at one face of said member 11. Each of the said slots 12 is adapted to accommodate the ends of the contacting branches 10 of the adjacent spokes 9. The member 11 is also provided with an annular groove 13 in the face of which the grooves 12 are located. The ends of the branches 10 of the spokes 9 are provided with notches 14 registering with the groove 13 when the same are positioned in the grooves 12.

Engaging the inner periphery of the hub portion 11 is a sleeve 15 having adjacent one end a lateral flange 16 the diameter of which is substantially equal to the exterior diameter of the hub member 11, said flange 16 having an annular projection 17 adapted to engage the groove 13 of the member 11 and the notches 14 of the branches 10 of the spokes. The sleeve 15 is made rigid with the hub member 11 by bolts 18 which are adapted to bind the flange 16 to the member 11. The engagement of the annular projection 17 on the flange 16 prevents any radial movement of the branches 10 between the hub and the felly. It further relieves the strain on the sleeve 15 that may be caused by the end of the branches 10 of the spokes 9 when the wheel is loaded.

Associated with the felly 5 is a demountable rim 19 maintained in place by locking members 20 of any suitable structure which are removably secured to the arcuated part 8 of some of the spokes by bearing plates 21. The locking member, as shown in the drawing, consists of two blocks adapted to engage the opposite sides of the rim 19 and which are drawn together and locked to the felly by means of the bolt which forms, preferably, an integral part of one of the blocks.

The sectorial spokes 9 are placed in position by engaging first the arcuated part 8 of the spoke into the annular groove 7 and then forcing the ends of the branches 10 of the spoke into the grooves 12. The groove 7, as will be seen, prevents any lateral displacement of the sectorial spokes 9 with reference to the felly; and by contacting the branches 10 of the adjacent sectorial spokes 9 the said spokes are reinforced, and any tendency of any of said spokes to move in the plane of the wheel is eliminated. The interlocking of the annular projection 17 and the branches 10 of the spokes also increases the rigidity of the wheel by eliminating any tendency of said spokes to move radially between the felly and the hub. The arcuated part 8 of the spoke, while reinforcing the felly 5, adds to the resiliency of the wheel, due to its curvature.

Having thus described my invention, I claim as new and desire to secure by Letters Patent:

1. In a vehicle wheel, a felly having annular beads adjacent the sides thereof forming a central annular groove, an annular hub portion having a radial slotted opening at one face thereof, sectorial spokes connecting the felly with the hub, the arcuated part of said spokes fitting into the central groove of the felly and the ends of the radial parts of said spokes being adapted to engage the radial grooves in the spokes, the radial parts of the adjacent spokes being adapted to contact with each other, said annular hub portion having an annular groove, said radial parts of the spokes having notches adapted to register with said annular groove in said hub portion, a sleeve associated with said annular portion of the hub, and a lateral flange integral with said sleeve adapted to be secured to said hub portion, said flange having an annular projection adapted to engage the said annular groove and notches whereby said sectorial spokes are locked to the hub and whereby the same are prevented from radial displacement between the felly and the hub.

2. In a vehicle wheel, a felly, a hub portion, sectorial spokes from the felly to the hub portion, said hub portion having an annular groove, said spokes having notches adapted to register with the groove, and a flange secured to the hub portion, said flange having an annular projection adapted to engage the annular groove and the notches.

3. In a vehicle wheel, a felly, a hub portion, sectorial spokes from the felly to the hub portion, said hub portion having an annular groove at one face thereof, said spokes having notches adapted to register with the said groove, and a flange secured to the hub portion, said flange having a lateral annular projection adapted to engage the annular groove and the notches.

4. In a vehicle wheel, a felly, a hub portion having radiating slots open at one face thereof, sectorial spokes engaging the felly and the slots of the hub portion, said hub portion having an annular groove on the face where the slots are open, said spokes having notches adapted to register with the groove, and a flange secured to the hub portion, the said flange having a lateral annular projection adapted to engage the annular groove and the notches.

In testimony whereof I have signed my name to this specification in the presence of two subscribing witnesses.

JACOB HEIMLICHER.

Witnesses:
K. V. HAYMAKER,
WM. GEIGER.

Copies of this patent may be obtained for five cents each, by addressing the "Commissioner of Patents, Washington, D. C."